(12) United States Patent
Wu

(10) Patent No.: US 12,013,943 B2
(45) Date of Patent: Jun. 18, 2024

(54) DATA PROCESSING SYSTEM AND METHOD CAPABLE OF SEPARATING APPLICATION PROCESSES

(71) Applicant: TrustONE Security Inc., Taipei (TW)

(72) Inventor: Po-Shao Wu, New Taipei (TW)

(73) Assignee: TRUSTONE SECURITY INC., Taipei (TW)

( * ) Notice: Subject to any disclaimer, the term of this patent is extended or adjusted under 35 U.S.C. 154(b) by 282 days.

(21) Appl. No.: 17/717,710

(22) Filed: Apr. 11, 2022

(65) Prior Publication Data

US 2022/0327211 A1 Oct. 13, 2022

(30) Foreign Application Priority Data

Apr. 13, 2021 (TW) .................................. 110113160

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01); *G06F 21/565* (2013.01); *G06F 2221/034* (2013.01)

(58) Field of Classification Search
CPC ...... G06F 21/53; G06F 21/565; G06F 21/566; G06F 2221/034
USPC ......................................................... 726/27
See application file for complete search history.

(56) References Cited

U.S. PATENT DOCUMENTS

| | | | | |
|---|---|---|---|---|
| 9,740,870 B1* | 8/2017 | Shepard | .................. | G06F 21/60 |
| 9,830,469 B1* | 11/2017 | Anderson | ............... | G06F 21/44 |
| 9,928,365 B1* | 3/2018 | Anderson | .............. | G06F 21/552 |
| 10,540,523 B2* | 1/2020 | Anderson | ........... | G06F 21/6281 |
| 11,216,563 B1* | 1/2022 | Veselov | .............. | H04L 63/1408 |
| 11,468,168 B1* | 10/2022 | Blasco | .................. | G06F 9/3867 |
| 2012/0255002 A1* | 10/2012 | Sallam | .................. | G06F 21/566 |
| | | | | 726/23 |
| 2013/0305368 A1* | 11/2013 | Ford | ..................... | G06F 21/566 |
| | | | | 726/23 |

(Continued)

FOREIGN PATENT DOCUMENTS

CN 110647754 A * 1/2020 ......... G06F 16/1734

OTHER PUBLICATIONS

Machine translation of CN-110647754-A, pp. 1-16, Clarivate Analytics (2020) (Year: 2020).*

*Primary Examiner* — David P Zarka
(74) *Attorney, Agent, or Firm* — MUNCY, GEISSLER, OLDS & LOWE, P.C.

(57) ABSTRACT

A data processing system and a data processing method are capable of separating application processes. The data processing system of the invention includes a data storage device and at least one processor. When a user operates the at least one processor to execute an application process to access a designated file from the data storage device through a file control module residing in a kernel mode of an operating system, the file control module compares a user account of the user and M rules and M characteristics of the application process with a plurality of execution space setting data previously stored to obtain an authority data, where M is a natural number. The file control module selectively returns the designated file to the application process in accordance with the authority data.

10 Claims, 6 Drawing Sheets

(56) References Cited

U.S. PATENT DOCUMENTS

2014/0245376 A1* 8/2014 Hibbert ................. G06F 21/577
 726/1
2018/0189488 A1* 7/2018 Arora ........................ G06F 8/71
2018/0330094 A1* 11/2018 Goeb .................... G06F 16/182

* cited by examiner

DATA PROCESSING SYSTEM AND METHOD CAPABLE OF SEPARATING APPLICATION PROCESSES

CROSS-REFERENCE TO RELATED APPLICATION

This utility application claims priority to Taiwan Application Serial Number 110113160, filed Apr. 13, 2021, which is incorporated herein by reference.

BACKGROUND OF THE INVENTION

1. Field of the Invention

The invention relates to a data processing system and a data processing method capable of separating application processes, and more in particular, to a data processing system and a data processing method for separating authorities of application processes with multiple group settings.

2. Description of the Prior Art

Recently, malicious attacks on data processing systems by ransomware have become more and more rampant. Once the data processing system is attacked by ransomware, the ransomware will search for files stored in the data storage device of the data processing system, and then encrypt the searched files. Until the owner of the data processing system pays a ransom to the author of the ransomware in exchange for the encryption key by which the encrypted files can be decrypted.

Current operating systems all have the function of setting file read and write permissions to avoid file to be damaged. For example, the Windows operating system released by Microsoft Corporation provides an access control list (ACL), which can set read and write permissions on files for individual user accounts or account groups. However, if any malicious software intrudes into the data processing system, and as long as antivirus software has not detected it, the malicious software can destroy files as long as the user has permission.

As another example, the security-enhanced Linux (SELinux) operating system provides a mandatory access control (MAC) security mechanism implemented in the kernel. In addition to setting read and write permissions on files for individual user accounts or account groups, SELinux operating system can also set file access permissions for individual application processes. However, the SELinux operating system needs to set the permissions of individual application processes, and the operation of setting is not convenient. Moreover, malware can also see the existence of files, but it does not have permission, so it will try to obtain permission to destroy files.

There are many ways to find ransomware and to avoid infecting data processing systems with ransomware. However, there is still no effective way to prevent and to control the emerging new ransomware attacks. Currently, a technology for multiple settings of application processes is urgently needed to separate the authorities of the application processes, and the multiple settings must be a convenient operation.

In addition, after some malicious software invades the data processing system, it will link to a specific network address to steal or destroy data. So far, no technology has been proposed that can prevent malicious software from invading the data processing system and further linking to specific network addresses.

SUMMARY OF THE INVENTION

Accordingly, one scope of the invention is to provide a data processing system and a data processing method for separating authorities of application processes with multiple group settings. According to the data processing system and data processing method of the invention, multiple settings can be conveniently managed and planned, and the damage to files by malicious software can be effectively prevented, and the network linking of malicious software can be further effectively prevented.

A data processing system according to a preferred embodiment of the invention is capable of separating authorities of application processes. The data processing system according to the preferred embodiment of the invention includes a data storage device and at least one processor. The data storage device therein stores a plurality of files. The at least one processor is electrically connected to the data storage device, and functions in executing an operating system. The operating system has a kernel mode and a user mode. The operating system includes an execution space management module, an execution space setting record module, a process group management module, a process group setting record module, and a file control module. The execution space management module resides in the kernel mode of the operating system. The execution space setting record module resides in the kernel mode of the operating system, and is coupled to the execution space management module. The execution space setting record module therein stores a plurality of execution space setting data. Each execution space setting data include a respective process group setting data, a respective user group setting data and a respective file group setting data. The process group management module resides in the kernel mode of the operating system, and is coupled to the execution space management module. The process group setting record module resides in the kernel mode of the operating system, and is coupled to the process group management module. The process group setting record module therein stores a plurality of process group setting data. Each process group setting data include M first rules and N first characteristics, where M is a natural number, and N is an integer equal to or larger than M. Each first rule corresponds to at least one of the N first characteristics. The file control module resides in the kernel mode of the operating system, and is respectively coupled to the execution space management module and the process group management module. An application process resides in the user mode and therein stores M second rules and M second characteristics. Each second rule corresponds to one of the first rules and one of the second characteristics. When a first user operates the at least one processor to execute the application process to access a designated file of the plurality of files from the data storage device through the file control module, the file control module retrieves a user account of the first user, the M second rules and the M second characteristics of the application process, and a file location and a designed filename of the designated file. The file control module retrieves the plurality of process group setting data, the plurality of user group setting data and the plurality of file group setting data through the execution space management module. The file control module retrieves the M first rules of each process group setting data and the N first characteristics of each process group setting data through the process group management module in accordance with the plurality of process group setting data. The file control module compares the user account, the M second rules, the M second characteristics, the file location and the designated filename with the plurality of user group setting data, the M first rules of each process group setting data, the N first characteristics of each process group setting data and the plurality of file group setting data to obtain a first comparison result. The file control module obtains a first authority data in accordance with the first comparison result. The file control module selectively returns the designated file to the application process in accordance with the first authority data.

Further, the data processing system according to the preferred embodiment of the invention also includes a network linking device. The network linking device is electrically connected to the at least one processor. The operating system also includes a network control module. The network control module resides in the kernel mode of the operating system, and is respectively coupled to the execution space management module and the process group management module. Each execution space setting data also include a respective network group setting data. When the first user operates the at least one processor to execute the application process to link to a designated network address through the network control module and the network linking device, the network control module retrieves the user account of the first user, the M second rules and the M second characteristics of the application process and the designated network address. The network control module retrieves the plurality of process group setting data, the plurality of user group setting data and the plurality of network group setting data through the execution space management module. The network control module retrieves the M first rules of each process group setting data and the N first characteristics of each process group setting data through the process group management module in accordance with the plurality of process group setting data. The network control module compares the user account, the M second rules, the M second characteristics and the designated network address with the plurality of user group setting data, the M first rules of each process group setting data, the N first characteristics of each process group setting data and the plurality of network group setting data to obtain a second comparison result. The network control module obtains a second authority data in accordance with the second comparison result. The network control module selectively links to the designated network address through the network linking device in accordance with the second authority data.

In one embodiment, the operating system also includes an execution space management tool. The execution space management tool resides in the user mode of the operating system, and is coupled to the execution space management module. The execution space management tool provides at least one graphical user interface for a second user to alter the plurality of execution space setting data through the execution space management module.

In one embodiment, the operating system also includes a process group management tool. The process group management tool resides in the user mode of the operating system, and is coupled to the process group management module. The process group management tool provides at least one second graphical user interface for the second user to alter the plurality of process group setting data through the process group management module.

In one embodiment, the M first rules can include a file location, a file size, a check sum, an issuer company, a product name, a certification, and a file version or other rules.

A data processing method according to a preferred embodiment of the invention is capable of separating authorities of application processes. A data storage device therein stores a plurality of files. At least one processor is electrically connected to the data storage device, and functions in executing an operating system. The operating system has a kernel mode and a user mode. The operating system includes an execution space management module, an execution space setting record module, a process group management module, a process group setting record module, and a file control module. The execution space management module resides in the kernel mode of the operating system. The execution space setting record module resides in the kernel mode of the operating system, and is coupled to the execution space management module. The execution space setting record module therein stores a plurality of execution space setting data. Each execution space setting data include a respective process group setting data, a respective user group setting data and a respective file group setting data. The process group management module resides in the kernel mode of the operating system, and is coupled to the execution space management module. The process group setting record module resides in the kernel mode of the operating system, and is coupled to the process group management module. The process group setting record module therein stores a plurality of process group setting data. Each process group setting data comprise M first rules and N first characteristics, where M is a natural number, and N is an integer equal to or larger than M. Each first rule corresponds to at least one of the N first characteristics. The file control module resides in the kernel mode of the operating system, and is respectively coupled to the execution space management module and the process group management module. An application process resides in the user mode of the operating system, and therein stores M second rules and M second characteristics. Each second rule corresponds to one of the first rules and one of the second characteristics. The data processing method according to the preferred embodiment of the invention is, firstly, by the file control module to retrieve a user account of the first user, the M second rules and the M second characteristics of the application process, and a file location and a designed filename of the designated file when a first user operates the at least one processor to execute the application process to access a designated file of the plurality of files from the data storage device through the file control module. Next, the data processing method according to the invention is by the file control module to retrieve the plurality of process group setting data, the plurality of user group setting data and the plurality of file group setting data through the execution space management module. Then, the data processing method according to the invention is by the file control module to retrieve the M first rules of each process group setting data and the N first characteristics of each process group setting data through the process group management module in accordance with the plurality of process group setting data. Subsequently, the data processing method according to the invention is by the file control module to compare the user account, the M second rules, the M second characteristics, the file location and the designated filename with the plurality of user group setting data, the M first rules of each process group setting data, the N first characteristics of each process group setting data and the plurality of file group setting data to obtain a first comparison result. Afterward, the data processing method according to the invention is by the file control module to obtain a first authority data in accordance with the first comparison result. Finally, the data processing method according to the invention is by the file control module to selectively return the designated file to the application process in accordance with the first authority data.

Compared to the prior art, the data processing system and the data processing method according to the invention create execution space setting data including process group setting data, user group setting data and file group setting data, and thereby, the data processing system and the data processing according to the invention can conveniently manage and plan multiple settings, effectively prevent malicious software from damaging files, and further effectively prevent malicious software from linking to the network.

The advantage and spirit of the invention may be understood by the following recitations together with the appended drawings.

BRIEF DESCRIPTION OF THE APPENDED DRAWINGS

DETAILED DESCRIPTION OF THE INVENTION

Some preferred embodiments and practical applications of this present invention would be explained in the following paragraph, describing the characteristics, spirit, and advantages of the invention.

Figure 1:
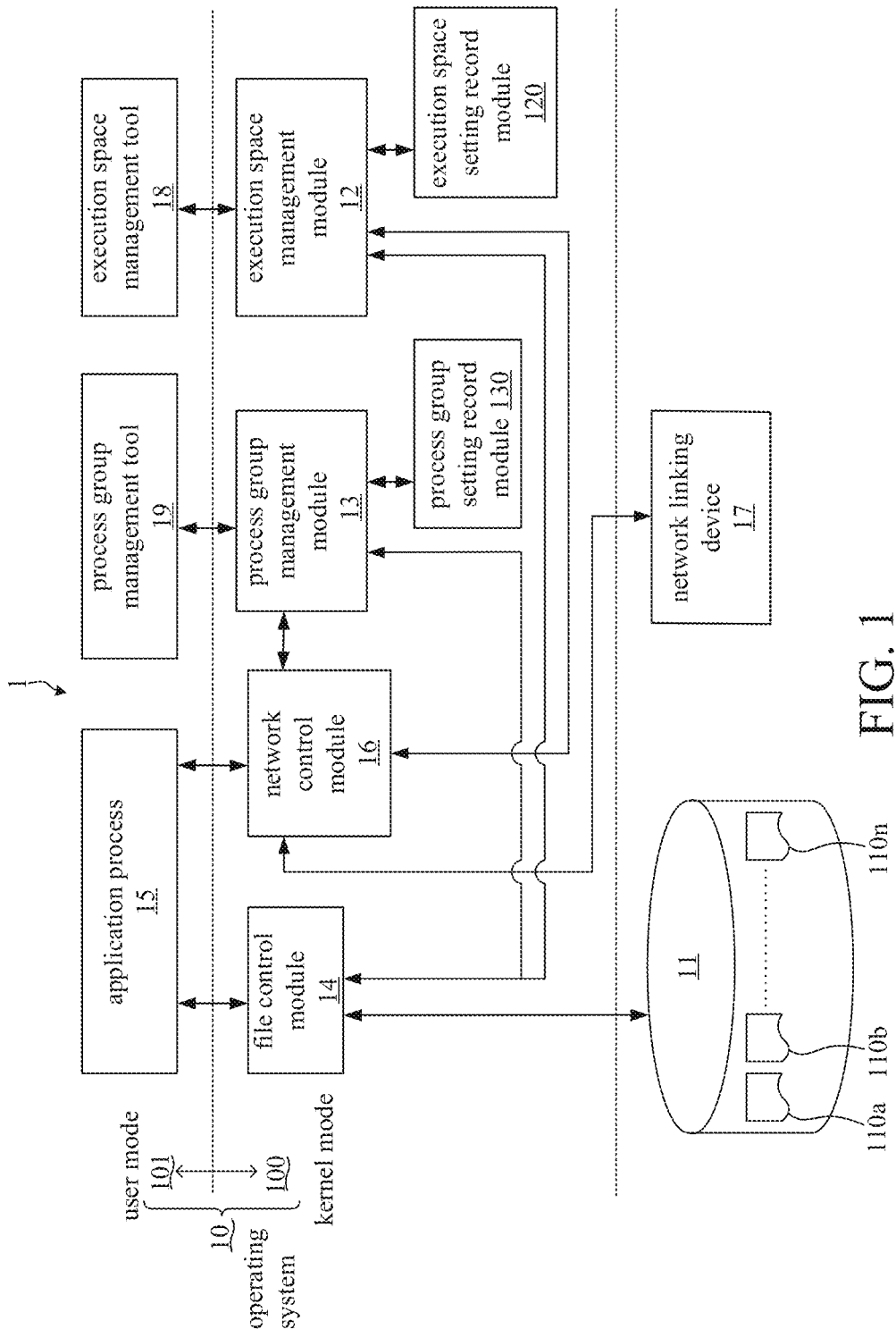
FIG. 1 is a schematic diagram showing the architecture of a data processing system according to the preferred embodiment.

Referring to FIG. 1, the architecture of a data processing system 1 according to the preferred embodiment of the invention is illustratively shown in FIG. 1. The data processing system 1 according to the preferred embodiment of the invention is capable of separating authorities of application processes.

In one embodiment, the data processing system 1 according to the invention can be various personal data processing system, such as a notebook computer, a desktop computer, a tablet PC, a smart phones, and so on. The data processing system 1 according to the invention can also be a server.

As shown in FIG. 1, the data processing system 1 according to the preferred embodiment of the invention includes a data storage device 11 and at least one processor (not shown in FIG. 1). The data storage device 11 therein stores a plurality of files (110a~110n).

The at least one processor is electrically connected to the data storage device 11, and functions in executing an operating system 10. The operating system 10 has a kernel mode 100 and a user mode 101. The operating system 10 includes an execution space management module 12, an execution space setting record module 120, a process group management module 13, a process group setting record module 130, and a file control module 14.

The execution space management module 12 resides in the kernel mode 100 of the operating system 10. The execution space setting record module 120 resides in the kernel mode 100 of the operating system 10, and is coupled to the execution space management module 12. The execution space setting record module 120 therein stores a plurality of execution space setting data. In particular, each execution space setting data include a respective process group setting data, a respective user group setting data and a respective file group setting data. It should be stated that "execution space" is a technical term created by this present invention, which is completely different from the "storage space" of the data storage device 11, and should be interpreted in the broadest sense according to the characteristics and spirit of "execution space", and should not be limited to its name.

The process group management module 13 resides in the kernel mode 100 of the operating system 10, and is coupled to the execution space management module 12. The process group setting record module 130 resides in the kernel mode 100 of the operating system 10, and is coupled to the process group management module 13. The process group setting record module 130 therein stores a plurality of process group setting data. Each process group setting data include M first rules and N first characteristics, where M is a natural number, and N is an integer equal to or larger than M. Each first rule corresponds to at least one of the N first characteristics.

In one embodiment, the M first rules can include a file location, a file size, a check sum, an issuer company, a product name, a certification, and a file version or other rules.

The file control module 14 resides in the kernel mode 100 of the operating system 10, and is respectively coupled to the execution space management module 12 and the process group management module 13.

Application processes 15, such as trusted text editors (for example, Microsoft Word editor), untrusted ransomwares, etc., all reside in the user mode 101 of the operating system 10, and therein stores M second rules and M second characteristics. Each second rule corresponds to one of the first rules and one of the second characteristics.

When a first user operates the at least one processor to execute an application process 15 to access a designated file of the plurality of files (110a~110n) from the data storage device 11 through the file control module 14, the file control module 14 retrieves a user account of the first user, the M second rules and the M second characteristics of the application process 15, and a file location and a designed filename of the designated file. The file control module 14 retrieves the plurality of process group setting data, the plurality of user group setting data and the plurality of file group setting data through the execution space management module 12. The file control module 14 retrieves the M first rules of each process group setting data and the N first characteristics of each process group setting data through the process group management module 13 in accordance with the plurality of process group setting data. The file control module 14 compares the user account, the M second rules, the M second characteristics, the file location and the designated filename with the plurality of user group setting data, the M first rules of each process group setting data, the N first characteristics of each process group setting data and the plurality of file group setting data, whether they are the same, to obtain a first comparison result. The file control module 14 obtains a first authority data in accordance with the first comparison result. The file control module 14 selectively returns the designated file to the application process 15 in accordance with the first authority data. That is to say, if the first authority data permit, the file control module 14 returns the designated file to the application process 15; and if the first authority data do not permit, the file control module 14 does not return the designated file to the application process 15. Please refer to the examples of execution spaces shown in FIG. 2.

Further, also as shown in FIG. 1, the data processing system 1 according to the preferred embodiment of the invention also includes a network linking device 17, e.g., a network card, etc. The network linking device 17 is electrically connected to the at least one processor. The operating system 10 also includes a network control module 16. The network control module 16 resides in the kernel mode 100 of the operating system 10, and is respectively coupled to the execution space management module 12 and the process group management module 13. Each execution space setting data also include a respective network group setting data. When the first user operates the at least one processor to execute the application process 15 to link to a designated network address through the network control module 16 and the network linking device 17, the network control module 16 retrieves the user account of the first user, the M second rules and the M second characteristics of the application process 15 and the designated network address. The network control module 16 retrieves the plurality of process group setting data, the plurality of user group setting data and the plurality of network group setting data through the execution space management module 12. The network control module 16 retrieves the M first rules of each process group setting data and the N first characteristics of each process group setting data through the process group management module 13 in accordance with the plurality of process group setting data. The network control module 16 compares the user account, the M second rules, the M second characteristics and the designated network address with the plurality of user group setting data, the M first rules of each process group setting data, the N first characteristics of each process group setting data and the plurality of network group setting data, whether they are the same, to obtain a second comparison result. The network control module 16 obtains a second authority data in accordance with the second comparison result. The network control module 16 selectively links to the designated network address through the network linking device 17 in accordance with the second authority data. That is to say, if the second authority data permit, the network control module 16 links to the designated network address through the network linking device 17; and if the second authority data do not permit, the network control module 16 does not link to the designated network address through the network linking device 17. Please refer to the examples of execution spaces shown in FIG. 2.

Figure 2:
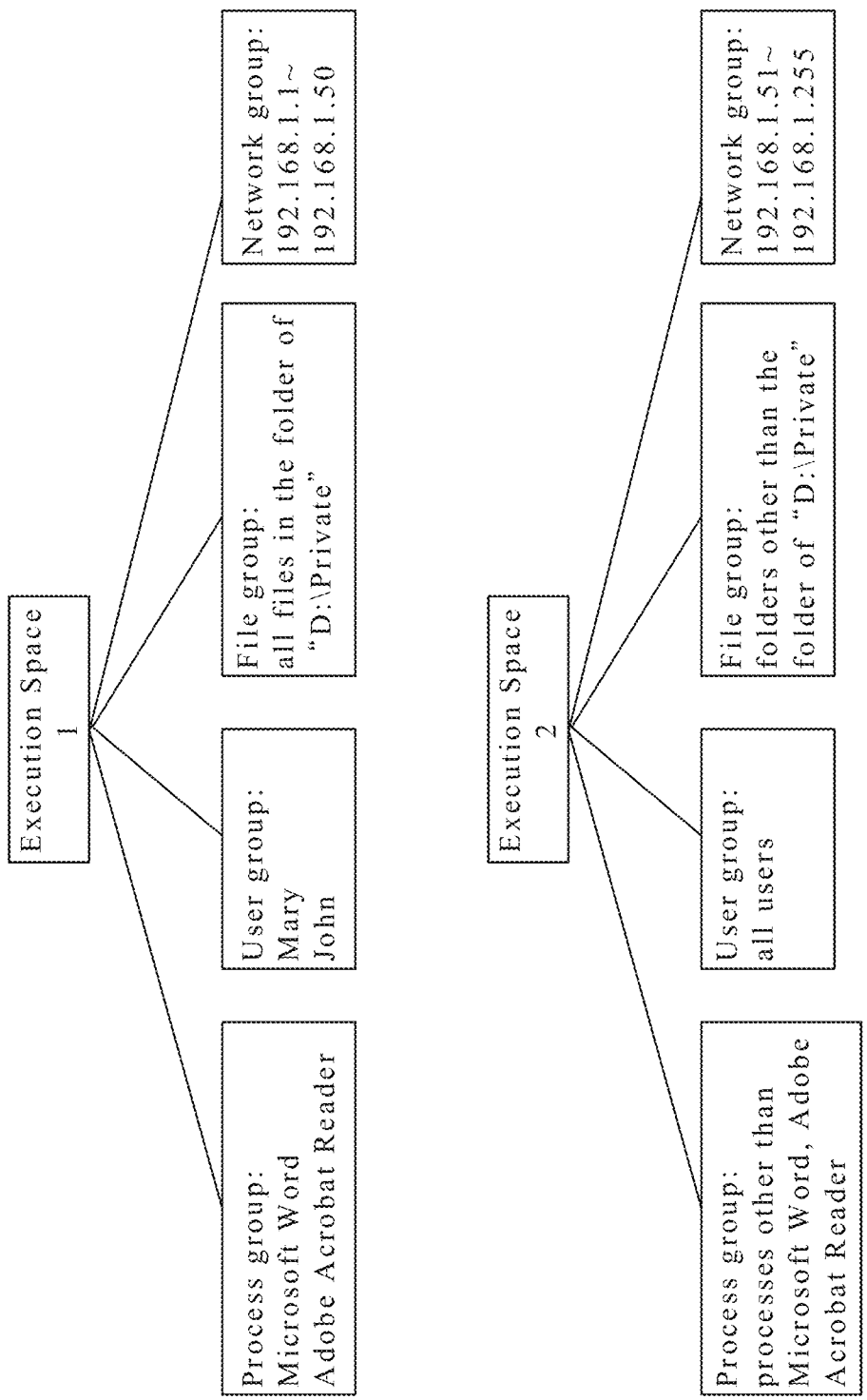
FIG. 2 is a schematic diagram of the architectures of two execution space examples set by the data processing system according to the preferred embodiment of the invention.

Referring to FIG. 2, the architectures of two examples of execution spaces: "Execution Space 1" and "Execution Space 2", set by the data processing system 1 according to the preferred embodiment of the invention, are schematically shown in FIG. 2. As shown in FIG. 2, according to the user group setting data, the process group setting data, the file group setting data and the network group setting data of "Execution Space 1", the user accounts in "Execution Space 1" are set to Mary or John. When the user, whose user account is Mary or John, executes Microsoft Word editor or Adobe Acrobat Reader, the user can view all the files in the folder of D:\Private, and can also link to the network addresses: 192.168.1.1~192.168.1.2.

Also as shown in FIG. 2, according to the user group setting data, the process group setting data, the file group setting data and the network group setting data of "Execution Space 2", the user accounts in "Execution Space 2" are set to all users. When the user, whose user account is any user, executes application processes other than Microsoft Word editor and Adobe Acrobat Reader, the user cannot view the files in the folder of D:\Private, but can view the folders other than the folder of D:\Private. The user can link to the network addresses: 192.168.1.51~192.168.1.255, but cannot link to the network addresses: 192.168.1.1~192.168.1.2.

In one embodiment, the operating system 10 also includes an execution space management tool 18. The execution space management tool 18 resides in the user mode 101 of the operating system 10, and is coupled to the execution space management module 12. The execution space management tool 18 provides at least one graphical user interface for a second user to alter the plurality of execution space setting data through the execution space management module 12.

Figure 3:
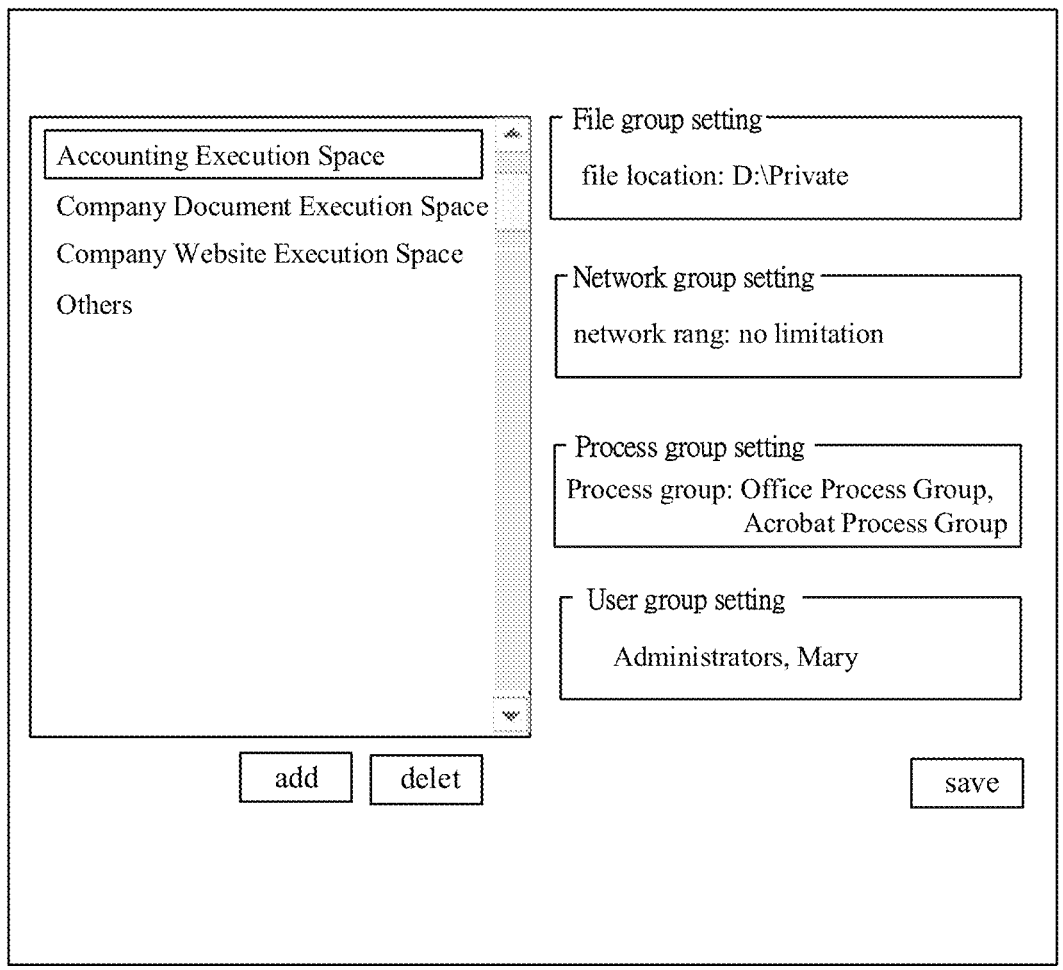
FIG. 3 is a schematic diagram of an example of a first graphical user interface provided by an execution space management tool of the data processing system according to the preferred embodiment of the invention.

Referring to FIG. 3, an example of a first graphical user interface provided by an execution space management tool 18 of the data processing system 1 according to the preferred embodiment of the invention is schematically shown in FIG. 3. As shown in FIG. 3, the execution spaces including "Accounting Execution Space", "Company Document Execution Space", "Company Website Execution Space", "Others" and so on are established. The first graphical user interface shown in FIG. 3 is switched to the setting screen of "Accounting Execution Space". The user group of "Accounting Execution Space" is set to Administrators and Mary. The process group of "Accounting Execution Space" is set to "Office Process Group" and "Acrobat Process Group". The network group of "Accounting Execution Space" is set to no limitation. The file group of "Accounting Execution Space" is set to "D:\Private".

In one embodiment, the operating system 10 also includes a process group management tool 19. The process group management tool 19 resides in the user mode 101 of the operating system 10, and is coupled to the process group management module 13. The process group management tool 19 provides at least one second graphical user interface for the second user to alter the plurality of process group setting data through the process group management module 13.

Figure 4:
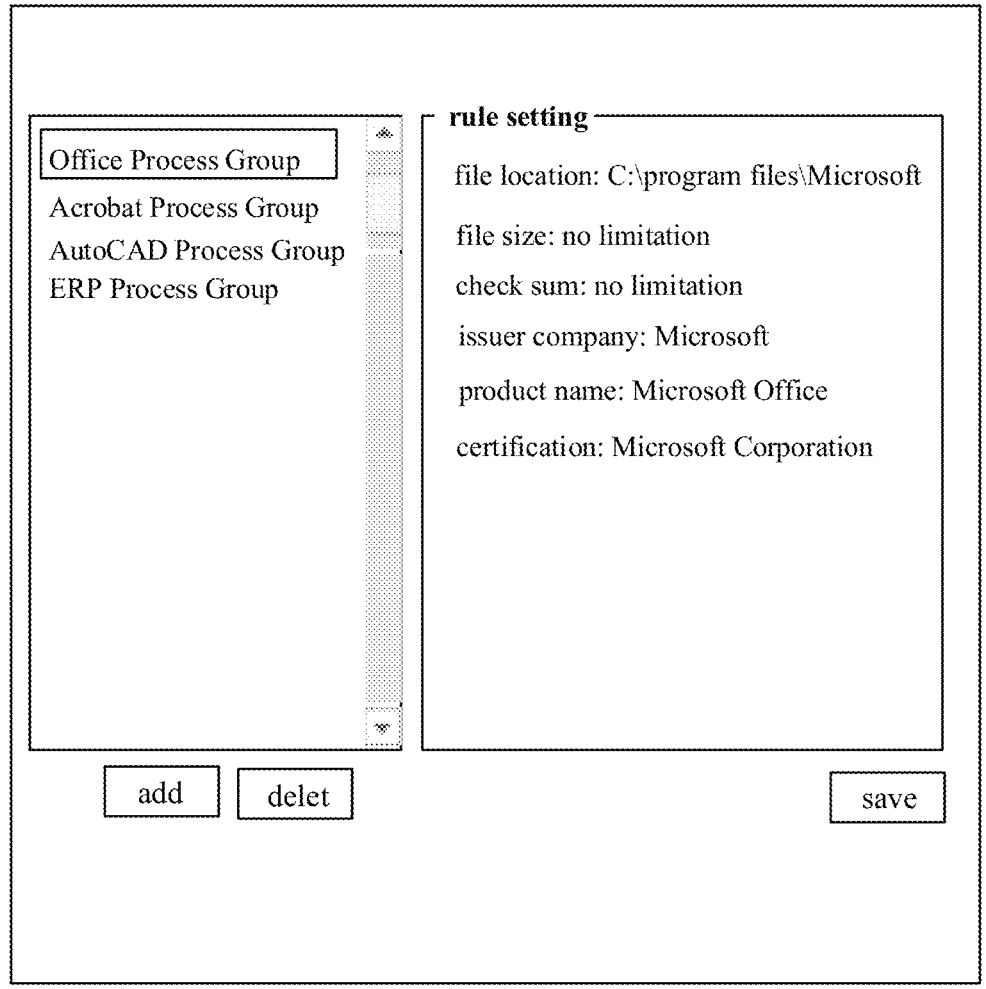
FIG. 4 is a schematic diagram of an example of a second graphical user interface provided by a process group management tool of the data processing system according to the preferred embodiment of the invention.

Referring to FIG. 4, an example of a second graphical user interface provided by a process group management tool 19 of the data processing system 1 according to the preferred embodiment of the invention is schematically shown in FIG. 4. As shown in FIG. 4, the application processes including "Office Process Group", "Acrobat Process Group", "Auto-CAD Process Group", "ERP Process Group" and so on are established. The second graphical user interface shown in FIG. 4 is switched to the setting screen of "Office Process Group". The user group of "Office Program Group" is set to Administrators and Mary. The first rules of "Accounting Execution Space" are set to include a file location, a file size, a check sum, an issuer company, a product name, and a certification.

It can be confirmed by the example of the first graphical user interface shown in FIG. 3 and the example of the second graphical user interface shown in FIG. 4 that the data processing system 1 according to the invention can conveniently manage and plan multiple settings, effectively prevent malicious software from damaging files, and further effectively prevent malicious software from linking to the network.

Figure 5:
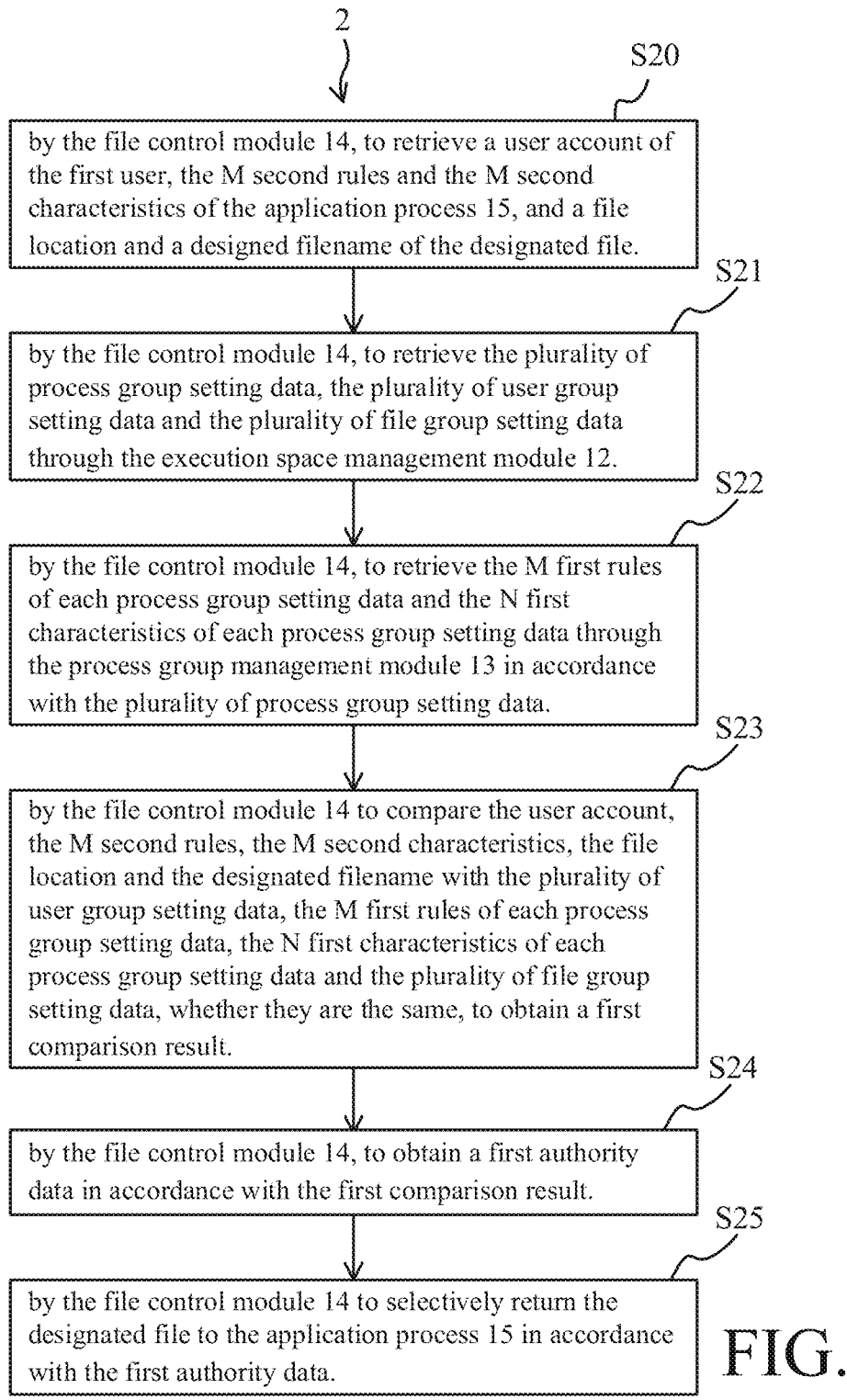
FIG. 5 is a flowchart illustrating a data processing method according to the preferred embodiment of the invention.

Referring to FIG. 5, FIG. 5 is flowchart illustrating a data processing method 2 according to the preferred embodiment of the invention. Regarding the implementation architecture of the data processing method 2 according to the invention, please refer to the architecture of the data processing system 1 as shown in FIG. 1. The data processing method 2 is capable of separating authorities of application processes 15. The implementation architecture of the data processing method 2 according to the invention is described hereinafter.

A data storage device 11 therein stores a plurality of files (110a~110n). At least one processor (not shown in FIG. 1) is electrically connected to the data storage device 11, and functions in executing an operating system 10. The operating system 10 has a kernel mode 100 and a user mode 101. The operating system 10 includes an execution space management module 12, an execution space setting record module 120, a process group management module 13, a process group setting record module 130, and a file control module 14. The execution space management module 12 resides in the kernel mode 100 of the operating system 10. The execution space setting record module 120 resides in the kernel mode 100 of the operating system 10, and is coupled to the execution space management module 12. The execution space setting record module 120 therein stores a plurality of execution space setting data. Each execution space setting data include a respective process group setting data, a respective user group setting data and a respective file group setting data. The process group management module 13 resides in the kernel mode 100 of the operating system 10, and is coupled to the execution space management module 12. The process group setting record module 130 resides in the kernel mode 100 of the operating system 10, and is coupled to the process group management module 13. The process group setting record module 130 therein stores a plurality of process group setting data. Each process group setting data comprise M first rules and N first characteristics, where M is a natural number, and N is an integer equal to or larger than M. Each first rule corresponds to at least one of the N first characteristics. The file control module 14 resides in the kernel mode 100 of the operating system 10, and is respectively coupled to the execution space management module 12 and the process group management module 13. An application process 15 resides in the user mode 101 of the operating system 10, and therein stores M second rules and M second characteristics. Each second rule corresponds to one of the first rules and one of the second characteristics.

Similarly, in one embodiment, the M first rules can include a file location, a file size, a check sum, an issuer company, a product name, a certification, and a file version or other rules.

Firstly, as shown in FIG. 5, the data processing method 2 according to the preferred embodiment of the invention performs step S20 by the file control module 14 to retrieve a user account of the first user, the M second rules and the M second characteristics of the application process 15, and a file location and a designed filename of the designated file when a first user operates the at least one processor to execute the application process 15 to access a designated file of the plurality of files (110a-110n) from the data storage device 11 through the file control module 14.

Next, the data processing method 2 according to the invention performs step S21 by the file control module 14 to retrieve the plurality of process group setting data, the plurality of user group setting data and the plurality of file group setting data through the execution space management module 12.

Then, the data processing method 2 according to the invention performs step S22 by the file control module 14 to retrieve the M first rules of each process group setting data and the N first characteristics of each process group setting data through the process group management module 13 in accordance with the plurality of process group setting data.

Subsequently, the data processing method 2 according to the invention performs step S23 by the file control module 14 to compare the user account, the M second rules, the M second characteristics, the file location and the designated filename with the plurality of user group setting data, the M first rules of each process group setting data, the N first characteristics of each process group setting data and the plurality of file group setting data, whether they are the same, to obtain a first comparison result.

Afterward, the data processing method 2 according to the invention performs step S24 by the file control module 14 to obtain a first authority data in accordance with the first comparison result.

Finally, the data processing method 2 according to the invention performs step S25 by the file control module 14 to selectively return the designated file to the application process 15 in accordance with the first authority data. That is to say, if the first authority data permit, the file control module 14 returns the designated file to the application process 15; and if the first authority data do not permit, the file control module 14 does not return the designated file to the application process 15. Please refer to the examples of execution spaces shown in FIG. 2.

The implementation architecture of the data processing method 2 according to the invention also includes a network linking device 17. The network linking device 17 is electrically to the at least one processor. The operating system 10 also includes a network control module 16. The network control module 16 resides in the kernel mode 100 of the operating system 10, and is respectively coupled to the execution space management module 12 and the process group management module 13. Each execution space setting data also include a respective network group setting data. Please refer to FIG. 6, a further flowchart of the data processing method 2 according to the preferred embodiment of the invention is schematically shown in FIG. 6.

Figure 6:
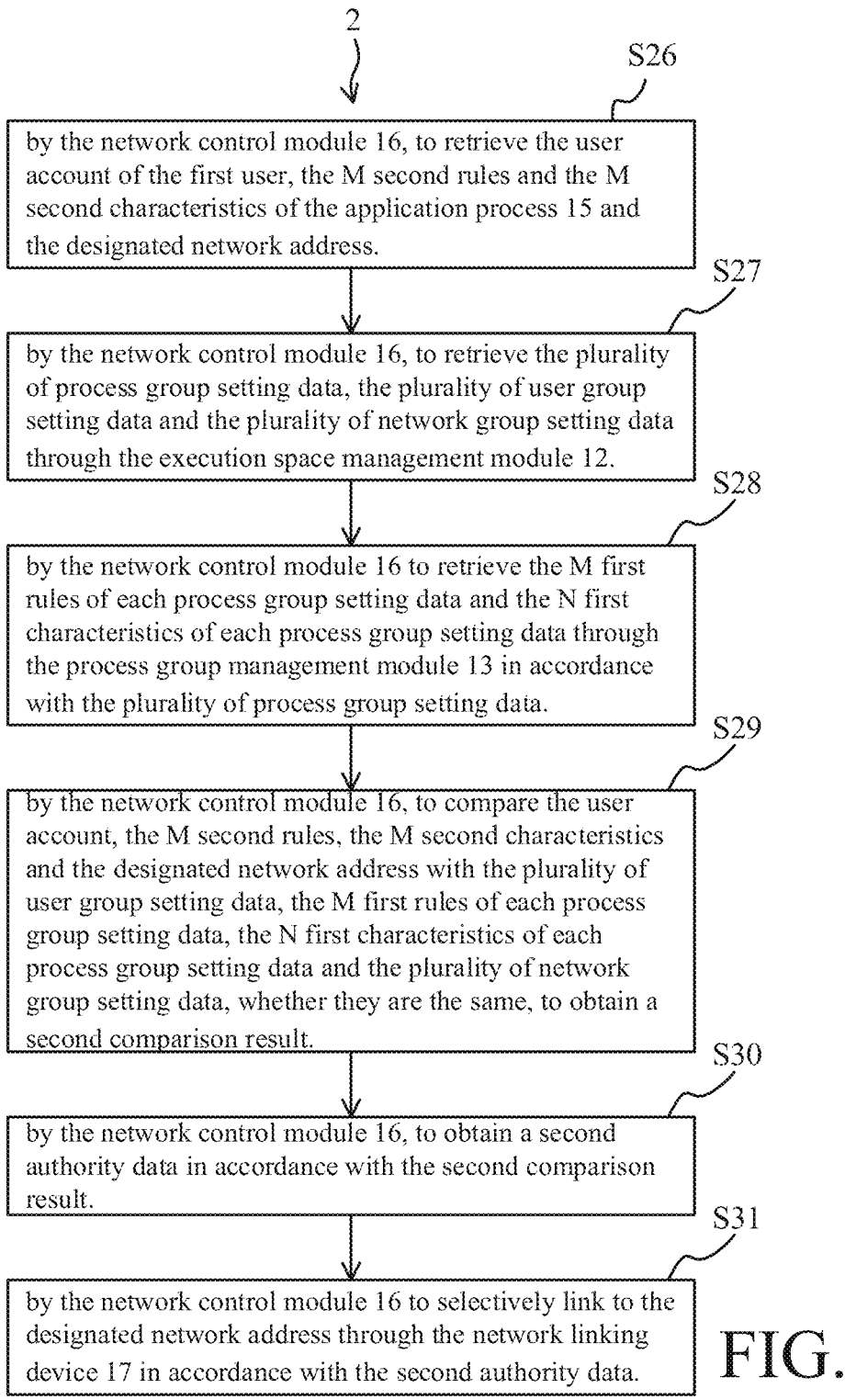
FIG. 6 is a further flowchart illustrating the data processing method according to the preferred embodiment of the invention.

As shown in FIG. 6, the data processing method 2 according to the preferred embodiment of the invention furtherly performs step S26 by the network control module 16 to retrieve the user account of the first user, the M second rules and the M second characteristics of the application process 15 and the designated network address when the first user operates the at least one processor to execute the application process 15 to link to a designated network address through the network control module 16 and the network linking device 17.

Next, the data processing method 2 according to the preferred embodiment of the invention performs step S27 by the network control module 16 to retrieve the plurality of process group setting data, the plurality of user group setting data and the plurality of network group setting data through the execution space management module 12.

Then, the data processing method 2 according to the preferred embodiment of the invention performs step S28 by the network control module 16 to retrieve the M first rules of each process group setting data and the N first characteristics of each process group setting data through the process group management module 13 in accordance with the plurality of process group setting data.

Subsequently, the data processing method 2 according to the preferred embodiment of the invention performs step S29 by the network control module 16 to compare the user account, the M second rules, the M second characteristics and the designated network address with the plurality of user group setting data, the M first rules of each process group setting data, the N first characteristics of each process group setting data and the plurality of network group setting data, whether they are the same, to obtain a second comparison result.

Afterward, the data processing method 2 according to the preferred embodiment of the invention performs step S30 by the network control module 16 to obtain a second authority data in accordance with the second comparison result.

Finally, the data processing method 2 according to the preferred embodiment of the invention performs step S31 by the network control module 16 to selectively link to the designated network address through the network linking device 17 in accordance with the second authority data. That is to say, if the second authority data permit, the network control module 16 links to the designated network address through the network linking device 17; and if the second authority data do not permit, the network control module 16 does not link to the designated network address through the network linking device 17. Please refer to the examples of execution spaces shown in FIG. 2.

In one embodiment, the operating system 10 also includes an execution space management tool 18. The execution space management tool 18 resides in the user mode 101 of the operating system 10, and is coupled to the execution space management module 12. The execution space management tool 18 provides at least one graphical user interface (as shown in FIG. 3) for a second user to alter the plurality of execution space setting data through the execution space management module 12.

In one embodiment, the operating system 10 also includes a process group management tool 19. The process group management tool 19 resides in the user mode 101 of the operating system 10, and is coupled to the process group management module 13. The process group management tool 19 provides at least one second graphical user interface (as shown in FIG. 4) for the second user to alter the plurality of process group setting data through the process group management module 13.

With the detailed description of the above preferred embodiments of the invention, it is clear to understand that the data processing system and the data processing method according to the invention create execution space setting data including process group setting data, user group setting data and file group setting data, and thereby, the data processing system and the data processing according to the invention can conveniently manage and plan multiple settings, effectively prevent malicious software from damaging files, and further effectively prevent malicious software from linking to the network.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:
1. A data processing system, comprising:
a data storage device, therein storing a plurality of files; and
at least one processor, being electrically connected to the data storage device and functioning in executing an operating system, the operating system having a kernel mode and a user mode and comprising:
an execution space management module, residing in the kernel mode;
an execution space setting record module, residing in the kernel mode and being coupled to the execution space management module, the execution space setting record module therein storing a plurality of execution space setting data, each execution space setting data comprising a respective process group setting data, a respective user group setting data and a respective file group setting data;
a process group management module, residing in the kernel mode and being coupled to the execution space management module;
a process group setting record module, residing in the kernel mode and being coupled to the process group management module, the process group setting record module therein storing a plurality of process group setting data, each process group setting data comprising M first rules and N first characteristics, M being a natural number, N being an integer equal to or larger than M, each first rule corresponding to at least one of the N first characteristics; and
a file control module, residing in the kernel mode and being respectively coupled to the execution space management module and the process group management module;
wherein an application process resides in the user mode and therein stores M second rules and M second characteristics, each second rule corresponds to one of the first rules and one of the second characteristics, when a first user operates the at least one processor to execute the application process to access a designated file of the plurality of files from the data storage device through the file control module, the file control module retrieves a user account of the first user, the M second rules and the M second characteristics of the application process, and a file location and a designed filename of the designated file, the file control module retrieves the plurality of process group setting data, the plurality of user group setting data and the plurality of file group setting data through the execution space management module, the file control module retrieves the M first rules of each process group setting data and the N first characteristics of each process group setting data through the process group management module in accordance with the plurality of process group setting data, the file control module compares the user account, the M second rules, the M second characteristics, the file location and the designated filename with the plurality of user group setting data, the M first rules of each process group setting data, the N first characteristics of each process group setting data and the plurality of file group setting data to obtain a first comparison result, and to obtain a first authority data in accordance with the first comparison result, the file control module selectively returns the designated file to the application process in accordance with the first authority data.

2. The data processing system of claim 1, further comprising:
a network linking device, electrically connected to the at least one processor, wherein the operating system also comprises a network control module, the network control module resides in the kernel mode, and is respectively coupled to the execution space management module and the process group management module,
wherein each execution space setting data also comprise a respective network group setting data, when the first user operates the at least one processor to execute the application process to link to a designated network address through the network control module and the network linking device, the network control module retrieves the user account of the first user, the M second rules and the M second characteristics of the application process and the designated network address, the network control module retrieves the plurality of process group setting data, the plurality of user group setting data and the plurality of network group setting data through the execution space management module, the network control module retrieves the M first rules of each process group setting data and the N first characteristics of each process group setting data through the process group management module in accordance with the plurality of process group setting data, the network control module compares the user account, the M second rules, the M second characteristics and the designated network address with the plurality of user group setting data, the M first rules of each process group setting data, the N first characteristics of each process group setting data and the plurality of network group setting data to obtain a second comparison result, the network control module obtains a second authority data in accordance with the second comparison result, the network control module selectively links to the designated network address through the network linking device in accordance with the second authority data.

3. The data processing system of claim 1, wherein the operating system also comprises an execution space management tool, the execution space management tool resides in the user mode and is coupled to the execution space management module, the execution space management tool provides at least one graphical user interface for a second user to alter the plurality of execution space setting data through the execution space management module.

4. The data processing system of claim 3, wherein the operating system also comprises a process group management tool, the process group management tool resides in the user mode and is coupled to the process group management module, the process group management tool provides at least one second graphical user interface for the second user to alter the plurality of process group setting data through the process group management module.

5. The data processing system of claim 1, wherein the M first rules comprise one selected from the group consisting of a file location, a file size, a check sum, an issuer company, a product name, a certification, and a file version.

6. A data processing method, wherein a data storage device therein stores a plurality of files, at least one processor is electrically connected to the data storage device and functions in executing an operating system, the operating system has a kernel mode and a user mode, and comprises an execution space management module, an execution space setting record module, a process group management module, a process group setting record module, and a file control module, the execution space management module resides in the kernel mode, the execution space setting record module resides in the kernel mode and is coupled to the execution space management module, the execution space setting record module therein stores a plurality of execution space setting data, each execution space setting data comprise a respective process group setting data, a respective user group setting data and a respective file group setting data, the process group management module resides in the kernel mode and is coupled to the execution space management module, the process group setting record module resides in the kernel mode and is coupled to the process group management module, the process group setting record module therein stores a plurality of process group setting data, each process group setting data comprise M first rules and N first characteristics, M is a natural number, N is an integer equal to or larger than M, each first rule corresponds to at least one of the N first characteristics, the file control module resides in the kernel mode and is respectively coupled to the execution space management module and the process group management module, an application process resides in the user mode and therein stores M second rules and M second characteristics, each second rule corresponds to one of the first rules and one of the second characteristics, said data processing method comprising the steps of:
when a first user operates the at least one processor to execute the application process to access a designated file of the plurality of files from the data storage device through the file control module, by the file control module, retrieving a user account of the first user, the M second rules and the M second characteristics of the application process, and a file location and a designed filename of the designated file;
by the file control module, retrieving the plurality of process group setting data, the plurality of user group setting data and the plurality of file group setting data through the execution space management module;
by the file control module, retrieving the M first rules of each process group setting data and the N first characteristics of each process group setting data through the process group management module in accordance with the plurality of process group setting data;
by the file control module, comparing the user account, the M second rules, the M second characteristics, the file location and the designated filename with the plurality of user group setting data, the M first rules of each process group setting data, the N first characteristics of each process group setting data and the plurality of file group setting data to obtain a first comparison result;
by the file control module, obtaining a first authority data in accordance with the first comparison result; and
by the file control module, selectively returning the designated file to the application process in accordance with the first authority data.

7. The data processing method of claim 6, wherein a network linking device is electrically connected to the at least one processor, the operating system also comprises a network control module, the network control module resides in the kernel mode, and is respectively coupled to the execution space management module and the process group management module, each execution space setting data also comprise a respective network group setting data, said data processing method further comprising the steps of:

when the first user operates the at least one processor to execute the application process to link to a designated network address through the network control module and the network linking device, by the network control module, retrieving the user account of the first user, the M second rules and the M second characteristics of the application process and the designated network address;

by the network control module, retrieving the plurality of process group setting data, the plurality of user group setting data and the plurality of network group setting data through the execution space management module;

by the network control module, retrieving the M first rules of each process group setting data and the N first characteristics of each process group setting data through the process group management module in accordance with the plurality of process group setting data;

by the network control module, comparing the user account, the M second rules, the M second characteristics and the designated network address with the plurality of user group setting data, the M first rules of each process group setting data, the N first characteristics of each process group setting data and the plurality of network group setting data to obtain a second comparison result;

by the network control module, obtaining a second authority data in accordance with the second comparison result; and by the network control module, selectively linking to the designated network address through the network linking device in accordance with the second authority data.

8. The data processing method of claim 6, wherein the operating system also comprises an execution space management tool, the execution space management tool resides in the user mode and is coupled to the execution space management module, the execution space management tool provides at least one graphical user interface for a second user to alter the plurality of execution space setting data through the execution space management module.

9. The data processing method of claim 8, wherein the operating system also comprises a process group management tool, the process group management tool resides in the user mode and is coupled to the process group management module, the process group management tool provides at least one second graphical user interface for the second user to alter the plurality of process group setting data through the process group management module.

10. The data processing method of claim 6, wherein the M first rules comprise one selected from the group consisting of a file location, a file size, a check sum, an issuer company, a product name, a certification, and a file version.

* * * * *